United States Patent
Yamamoto et al.

(10) Patent No.: US 9,003,753 B2
(45) Date of Patent: Apr. 14, 2015

(54) LAWN MOWER

(71) Applicant: Honda Motor Co., Ltd.

(72) Inventors: Takahiro Yamamoto, Wako (JP);
Tomokazu Kimura, Wako (JP); Kohei Akazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/023,555

(22) Filed: Sep. 11, 2013

(65) Prior Publication Data

US 2014/0075899 A1 Mar. 20, 2014

(30) Foreign Application Priority Data

Sep. 20, 2012 (JP) ................. 2012-206950

(51) Int. Cl.
*A01D 43/06* (2006.01)
*A01D 43/063* (2006.01)
*A01D 34/71* (2006.01)

(52) U.S. Cl.
CPC .............. *A01D 43/063* (2013.01); *A01D 34/71* (2013.01); *A01D 43/0636* (2013.01); *A01D 43/0635* (2013.01)

(58) Field of Classification Search
CPC ..... A01D 34/71; A01D 43/063; A01D 43/06; A01D 34/82; A01D 34/001
USPC .............. 56/202–206, 5, 13.3, 16.6, 194, 199
See application file for complete search history.

(56) References Cited

U.S. PATENT DOCUMENTS

| 3,351,229 | A | * | 11/1967 | Bridenstine | 206/505 |
| 5,546,738 | A | * | 8/1996 | Turner | 56/202 |
| 8,429,887 | B2 | * | 4/2013 | Sadler | 56/202 |

FOREIGN PATENT DOCUMENTS

| JP | 62-60126 U | 4/1987 |
| JP | 1-222716 A | 9/1989 |
| JP | 04-24902 Y2 | 6/1992 |

* cited by examiner

*Primary Examiner* — Robert Pezzuto
(74) *Attorney, Agent, or Firm* — Westerman, Hattori, Daniels & Adrian, LLP (57) ABSTRACT

A lawn mower includes: a cutting blade provided in a housing; a cut grass receptacle provided rearward of the housing; and a chute connecting between the housing and the cut grass receptacle, grass cut by the cutting blade being delivered, by cut grass delivering air, to the cut grass receptacle via the chute. The cut grass receptacle has a bottom plate detachably attachable thereto, and the cut grass receptacle is constructed to allow the bottom plate detached from the receptacle to be accommodated within the receptacle.

3 Claims, 7 Drawing Sheets

LAWN MOWER

FIELD OF THE INVENTION

The present invention relates to lawn mowers switchable between a bagging mode in which cut grass (grass clippings) is collected in a grass clippings receptacle and a rear discharge mode in which cut grass is discharged rearwardly and downwardly.

BACKGROUND OF THE INVENTION

Examples of the conventionally-known cut grass (grass clippings) processing schemes or modes include a bagging mode, a mulching mode and a discharge mode. The bagging mode is where grass cut by a cutting blade or grass clippings are collected in a grass clippings receptacle. The mulching mode is where grass clippings are chopped into finer pieces within the housing and then discharged downward of the housing. Further, the discharge mode is where grass clippings delivered from the housing are discharged directly downward without being collected in the grass clippings receptacle. Among the conventionally-known types of the discharge mode are a lateral discharge type (lateral discharge mode) where grass clippings are discharged laterally of the housing, and a rear discharge type (rear discharge mode) where grass clippings are discharged rearward of the housing.

Further, examples of the conventionally-known lawn mowers include one switchable between the bagging mode and the rear discharge mode. Switching between the bagging mode and the rear discharge mode is effected by attaching or detaching a grass clippings receptacle to or from an exit of a chute extending rearward from the housing. In the bagging mode, grass clippings are collected in the grass clippings receptacle attached to the exit of the chute. In the rear discharge mode, on the other hand, grass clippings are discharged downward with the grass clippings receptacle detached from the exit of the chute.

However, because the grass clippings receptacle is attached or detached each time switching is made between the bagging mode and the rear discharge mode, further improvements have to be made for securement of a storage location for the detached grass clippings receptacle and enhanced portability (i.e., ability to be easily carried) of the detached grass clippings receptacle. Thus, it may be conceivable to construct a bottom plate of the grass clippings receptacle as a pivotable plate and open the bottom plate by pivoting the bottom plate downwardly. Examples of such a technique for opening and closing the bottom plate of the grass clippings receptacle by vertically pivoting the bottom plate are known from Japanese Utility Model Application Laid-open Publication No. S62-60126 (hereinafter "Patent Literature 1"), Japanese Patent Application Laid-Open Publication No. H01-222716 (hereinafter "Patent Literature 2") and Japanese Post-Exam Utility Model Publication No. H04-24902 (hereinafter "Patent Literature 3").

The lawn mowers disclosed in Patent Literatures 1 to 3 are constructed so that, in the bagging mode, grass clippings are collected in the grass clippings receptacle and then the thus-collected grass clippings are discharged to a disposal site by the bottom plate being pivoted downward to open. Further, Patent Literature 3 discloses a lawn mower including a sliding bottom plate provided on the lower surface of the grass clippings receptacle. However, with the lawn mowers disclosed in Patent Literatures 1 to 3, an appropriate arrangement has to be made to prevent jamming of grass clippings in movable portions of the bottom plate, and besides a troublesome cleaning operation would be required.

SUMMARY OF THE INVENTION

In view of the foregoing prior art problems, it is an object of the present invention to provide an improved technique which can simplify the operation for switching between the bagging mode and the rear discharge mode and the lawn mower cleaning operation, and which can facilitate securement of a storage location for a component part detached from the lawn mower as a result of switching between the modes and achieve an enhanced portability of the detached component part.

In order to accomplish the above-mentioned object, the present invention provides an improved lawn mower, which comprises: a cutting blade provided in a housing; a cut grass receptacle disposed rearward of the housing; and a chute connecting between the housing and the cut grass receptacle, grass cut by the cutting blade being delivered, by cut grass delivering air, to the cut grass receptacle via the chute, the cut grass receptacle having a bottom plate detachably attachable thereto, the cut grass receptacle being constructed to allow the bottom plate detached from the receptacle to be accommodated within the receptacle.

The bottom plate of the cut grass (grass clippings) receptacle is detachably attached to a lower portion of the cut grass receptacle in the bagging mode and detached from the lower portion of the cut grass receptacle in the rear discharge mode. Thus, the present invention can simplify the mode switching operation and the lawn mower cleaning operation as well. Further, because the bottom plate detached from the lower portion of the cut grass receptacle can be snugly accommodated within the cut grass receptacle, it is not necessary for the human operator to carry the detached bottom plate by hand or the like, nor is it necessary for the human operator to secure a separate storage location for the detached bottom plate.

Preferably, the bottom plate is a collapsible member, and the chute includes a support section provided on an end portion thereof for supporting the cut grass receptacle. Further, with the cut grass receptacle supported by the support section, at least a part of the support section is located within the cut grass receptacle, and the part of the support section includes a placing portion for placing thereon the bottom plate folded in a collapsed position. Thus, the bottom plate detached from the cut grass receptacle can be collapsed into a smaller size, and the collapsed bottom plate can be readily snuggly accommodated within the cut grass receptacle by being merely placed on the placing portion.

Further, preferably, in a placed-on position of the bottom plate where the bottom plate is placed on the placing portion of the support section, the bottom plate faces an exit of the chute in such a manner that the cut grass and cut grass delivering air, having entered the cut grass receptacle through the exit, are directed downward by the bottom plate. Thus, the cut grass having entered the cut grass receptacle can be discharged directly downward through the lower portion of the grass clippings receptacle The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

In the following description, the terms "front", "rear", "left", "right", "upward", "downward" etc. are used to refer to directions as viewed from a human operator of a lawn mower of the present invention.

Figure 1:
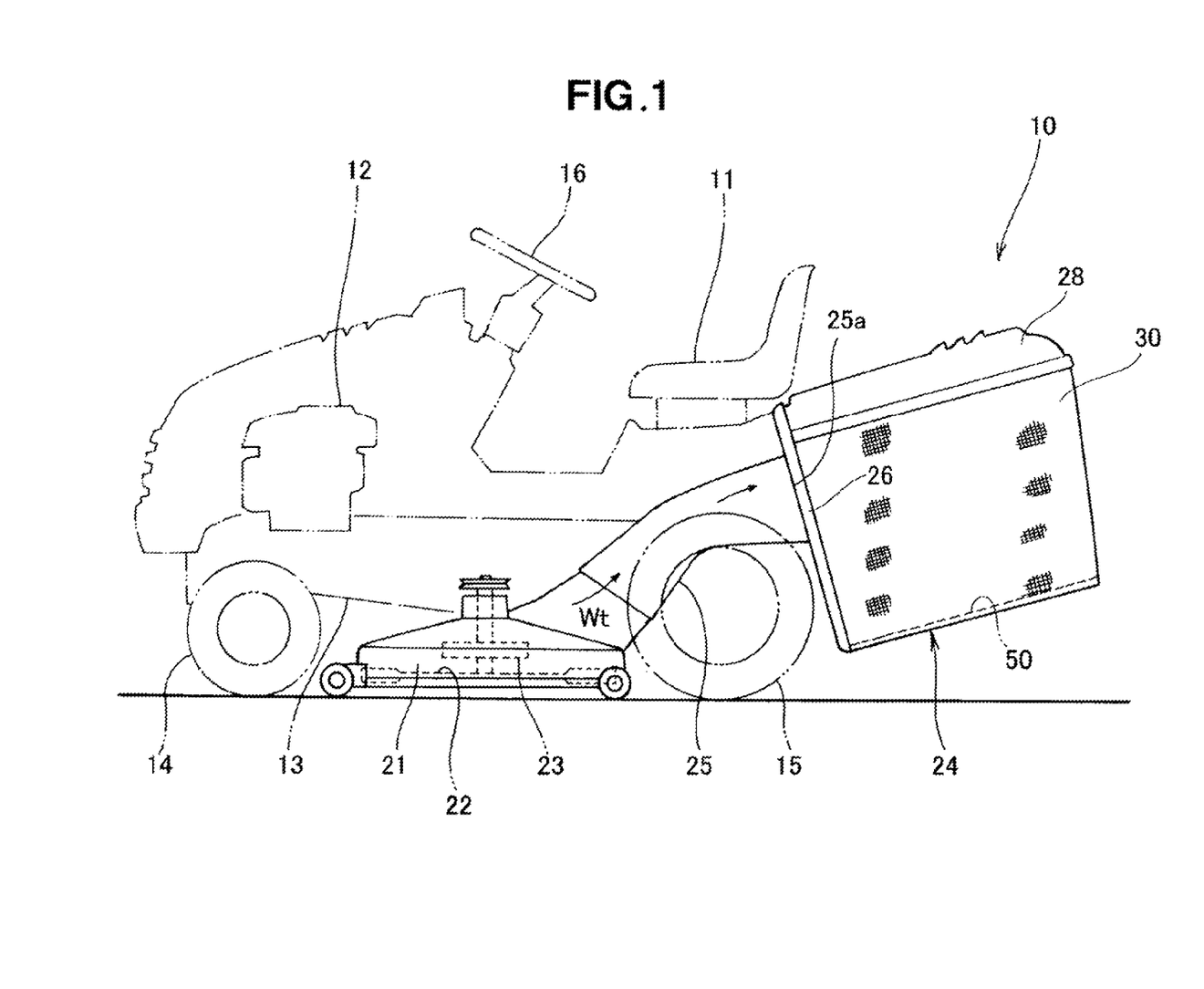
FIG. 1 is a side view of a lawn mower according to an embodiment of the present invention.

Now, a description will be given about an embodiment of the lawn mower 10 of the present invention. As shown in FIG. 1, the lawn mower 10 is a working machine of a type in which the human operator rides on a seat 11 and drives a grass cutting system while running the lawn mower 10 by means of a single power source 12.

The power source 12 is, for example, in the form of an engine or electric motor and provided on a front upper section of a machine frame 13 (vehicle body frame 13) of the lawn mower 10. The machine frame 13 has left and right front wheels 14 provided on left and right sides of a front section thereof and left and right rear wheels 15 provided on left and right sides of a rear section thereof. The left and right front wheels 14 are steered via a steering wheel 16 provided on a front section of the machine frame 13, and the left and right rear wheels 15 are driven via the power source 12.

The lawn mower 10 includes: a housing 21; a cutting blade 22 and an auxiliary fan 23 provided within the housing 21; a cut grass receptacle (grass clippings receptacle) 24; and a chute 25 connecting between the housing 21 and the grass clippings receptacle 24. Grass cut by the cutting blade 22 (grass clippings) are delivered via the chute 25 to the grass clippings receptacle 24 by grass clippings delivering air (cut grass delivering air) Wt, so that the grass clippings are collected in the grass clippings receptacle 24.

The cutting blade 22 and the auxiliary fan 23 are driven by the power source 12. Rotation of the cutting blade 22 not only cuts grass but also generates a flow of air swirling within the housing 21, i.e. swirling air flow Wt (namely, grass clippings delivering air Wt) within the housing 21. The auxiliary fan 23 is provided, immediately over the cutting blade 22 within the housing 21, to increase the volume of the grass clippings delivering air Wt.

Namely, by rotating the cutting blade 22, the lawn mower 10 can not only cut grass but also generate grass clippings delivering air Wt, increase the volume of the grass clippings delivering air Wt by means of the auxiliary fan 23 and send grass clippings into the grass clippings receptacle 24 by the grass clippings delivering air Wt. Further, the lawn mower 10 can proceed with a grass cutting operation by being caused to move forward.

Figure 2:
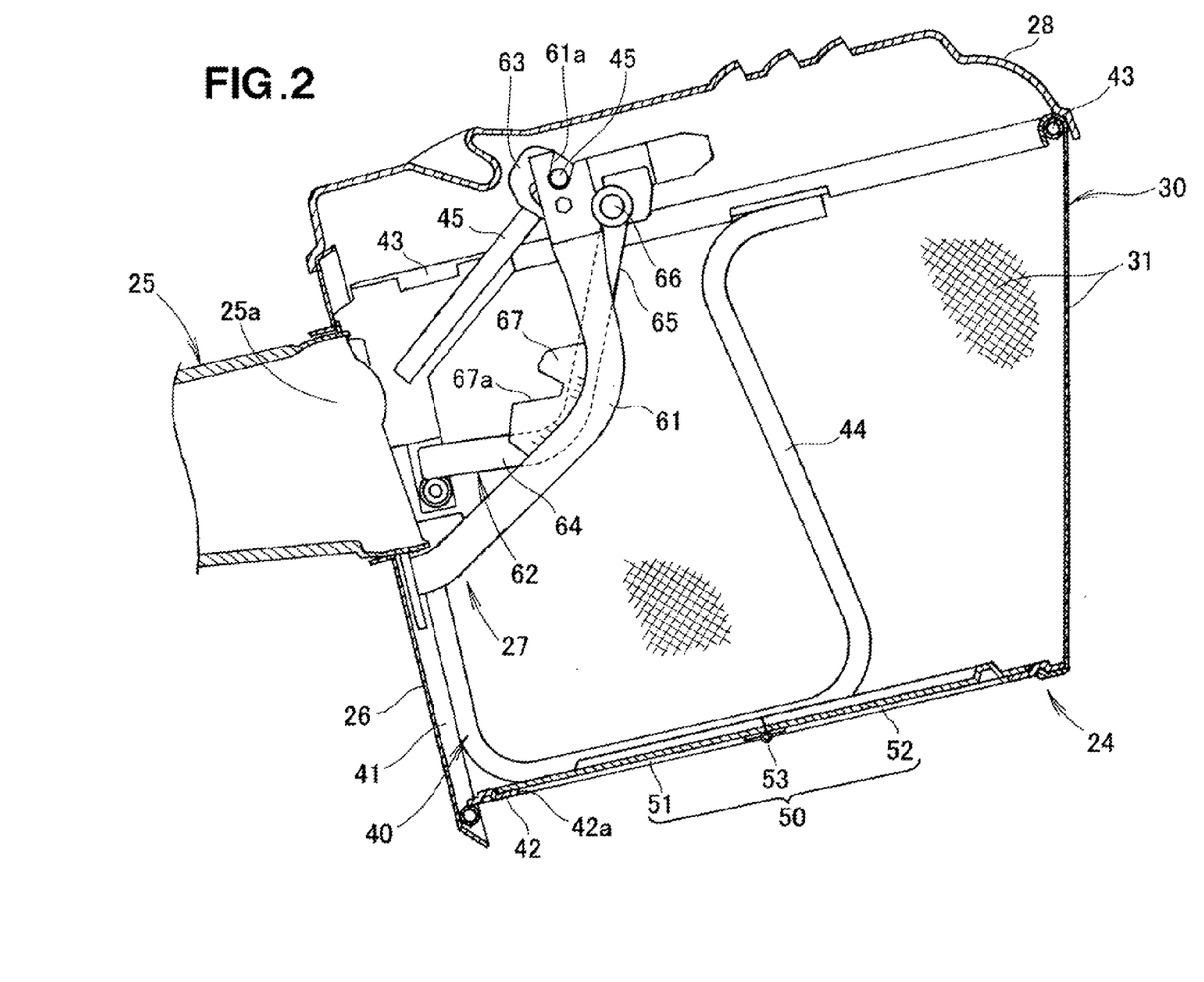
FIG. 2 is a sectional view illustrating a grass clippings receptacle shown in FIG. 1.

As shown in FIGS. 1 and 2, the grass clippings receptacle 24 is provided for collecting (or storing) grass cut by the cutting blade 22 and connected to an exit 25 at the rear end of the chute 25.

Figure 3:
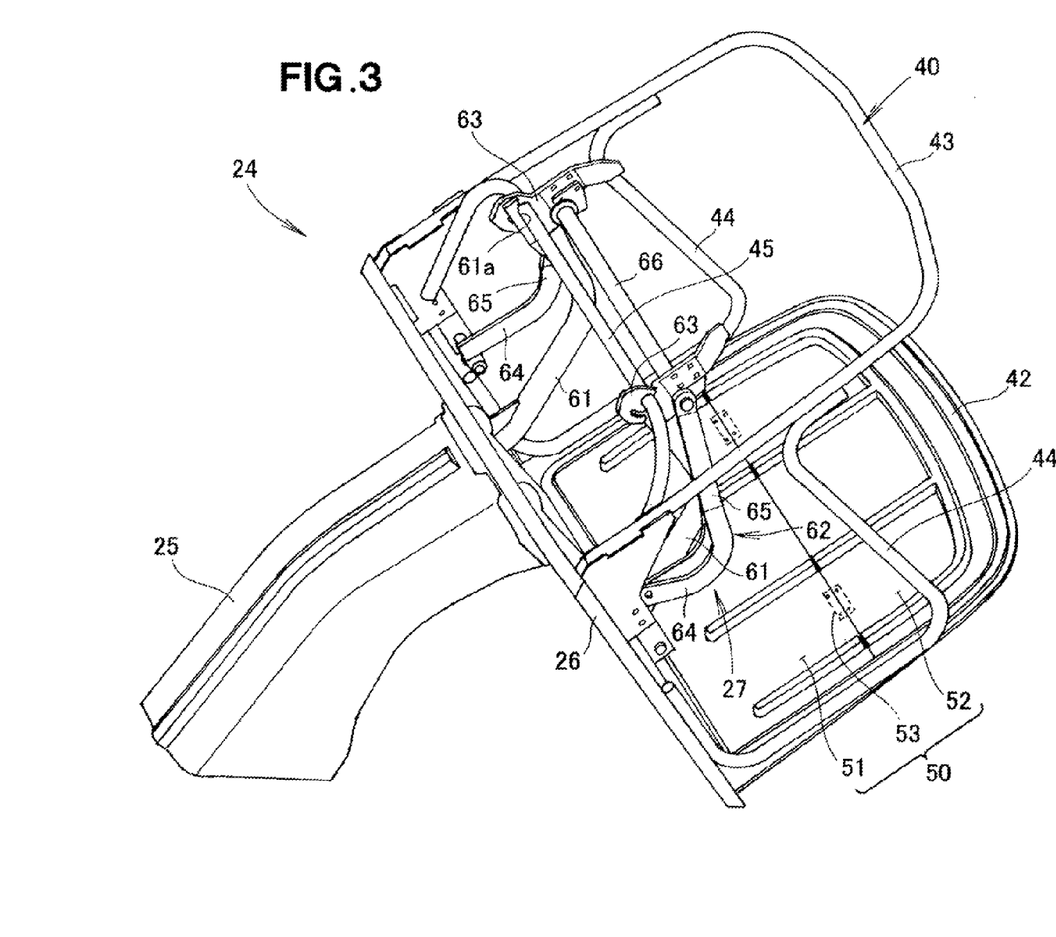
FIG. 3 is a perspective view of a retaining frame shown in FIG. 2 and a support section that supports the retaining frame.

Further, as shown in FIGS. 2 and 3, the grass clippings receptacle 24 is constructed as a basket-shaped container having a substantially rectangular shape as viewed in top plan and a substantially rectangular shape as viewed in side elevation, and the grass clippings receptacle 24 is open at its top and front sides. The grass clippings receptacle 24 is detachably attached at the open front side to a rear end portion of the chute 25 by means of a back plate 26 and a support section 27, and the open top side of the grass clippings receptacle 24 is covered with a detachable lid 28. The grass clippings receptacle 24 opening at its front and top sides includes a grass bag 30, a retaining frame 40 and a bottom plate 50.

The grass bag 30, which is provided for collecting grass clippings, is formed, for example, of a coarse-woven fabric or mesh. As viewed from above, the grass clippings receptacle 24 has a substantially U shape opening forward, through which grass delivering air can pass. The grass delivering air having delivered grass clippings from the housing 21 (FIG. 1) to the grass clippings receptacle 24 is promptly discharged to the outside through side surfaces 31 of the grass bag 30.

The retaining frame 40 is disposed within the grass bag 30 for retaining the shape of the grass bag 30, and it includes a front frame member 41, a bottom frame member 42, an upper frame member 43 and left and right side frame members 44.

The front frame member 41 is in the form of a pipe disposed in a front portion of the grass bag 30 and having a substantially U shape as viewed in front elevation. A connection frame member 45, having a substantially forward-opening U shape as viewed in top plan, connects between the left and right upper ends of the front frame member 41. The connection frame member 45 slants rearwardly and upwardly from the left and right upper ends of the front frame member 41. The connection frame 45 is joined at its left and right front end portions to the left and right upper ends of the front frame 41.

The bottom frame member 42 is in the form of a flat plate having a substantially rectangular shape as viewed in top plan and extending rearward from the lower end of the front frame member 41, and the bottom frame member 42 has an opening 42a of a substantially rectangular shape 42a formed vertically therethrough.

The upper frame member 43 is in the form of a pipe having a substantially U shape as viewed in top plan and extending rearward from the upper ends of the front frame 41. The upper frame member 43 is joined at its left and right front end portions to the left and right upper ends of the front frame member 41.

The left and right side frame members 44 are each in the form of a pipe having a substantially U shape as viewed in side elevation and connecting together the front frame member 41, bottom frame member 42 and upper frame member 43.

Figure 4:
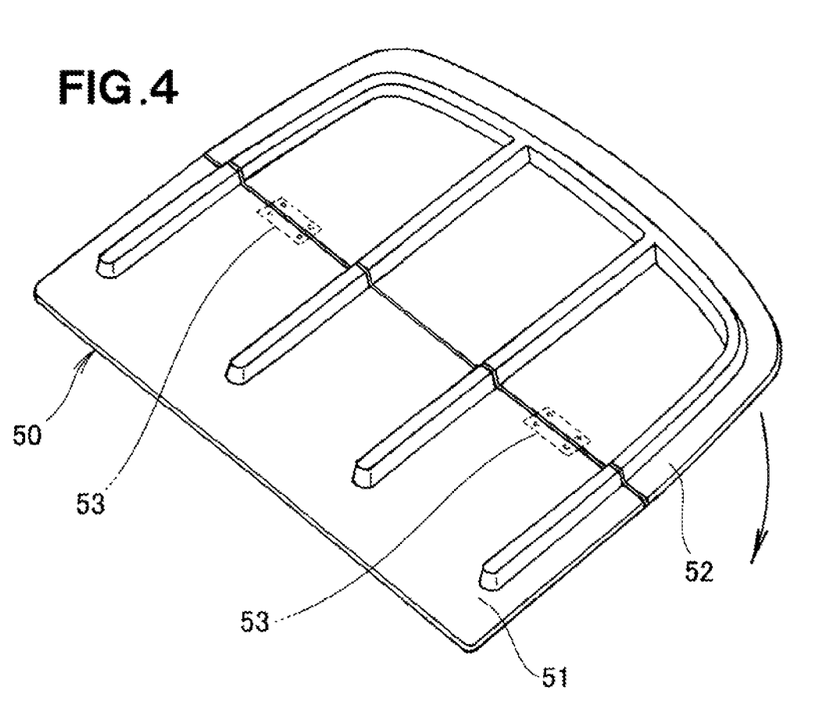
FIG. 4 is a perspective view of a bottom plate of FIG. 3 in a deployed position.
Figure 5:
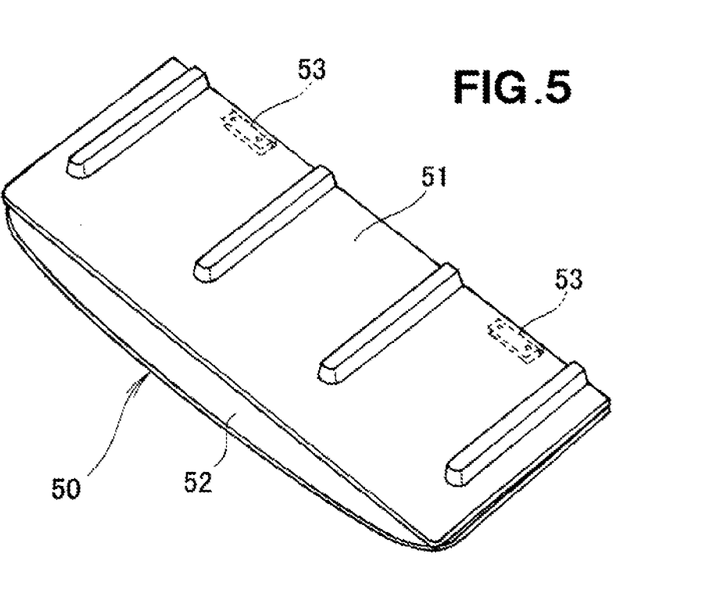
FIG. 5 is a perspective view of the bottom plate of FIG. 3 in a collapsed position.

The bottom plate 50, which is for example molded of resin, is placed on the bottom frame member 42 in such a manner that the opening 42a of the bottom frame member 42 is openable and closable as desired. The bottom plate 50 is a member detachably attachable to the bottom frame member 42 and collapsible relative to the bottom frame member 42. As shown in FIGS. 4 and 5, the bottom plate 50 is divided in two sections, i.e. front and rear half sections 51 and 52.

The front and rear half sections 51 and 52 of the bottom plate 50 are interconnected by means of hinges 53. Thus, the bottom plate 50 is switchable as desired between an opened or deployed position shown in FIG. 4 and a collapsed position shown in FIG. 5. The deployed bottom plate 50 can be placed on the opening 42a to close the opening 42a as shown in FIGS. 2 and 3. Note that the hinges 53 may be formed integrally with the front and rear half sections 51 and 52 of the bottom plate 50.

As further shown in FIGS. 2 and 3, the back plate 26 is a vertical flat plate attached to a rear end portion of the chute 25. The open front side of the grass clippings receptacle 24 is closed with the back plate 26 by being superposed on the back plate 26 from rearward.

Further, the support section 27, which is provided for supporting the grass clippings receptacle 24, is attached to the back plate 26. Namely, the support section 27 is attached to the chute 25 via the back plate 26. More specifically, the support section 27 includes left and right receptacle supporting portions 61, a locking pivot arm 62 and left and right lock portions 63.

Each of the left and right receptacle supporting portions 61 has a substantially L shape as viewed in side elevation and is fixed at its lower end portion to a lower portion of the back plate 26. Further, the left and right receptacle supporting portions 61 each have a support recess 61a formed at its upper end and having a substantially U shape as viewed in side elevation for engaging therein one of opposite end portions of the connection frame member 45.

The locking pivot arm 62, which has a substantially U shape as viewed in top plan, is vertically pivotably connected at its left and right lower end portions to a lower portion of the back plate 26. More specifically, the locking pivot arm 62 includes: left and right horizontal arm sections 64 extending rearward from the lower portion of the back plate 26; left and right vertical arm sections 65 extending upward from the rear ends of the left and right horizontal arm sections 64; and a horizontal cross bar 66 connecting between upper end portions of the left and right vertical arm sections 65. The left and right horizontal arm sections 64 are vertically pivotably connected at their front lower ends to the lower portion of the back plate 26. The cross bar 66 is located near the upper ends of the left and right receptacle supporting portions 61.

Further, the left and right lock portions 63 are connected to opposite end portions of the cross bar 66 in such a manner that they are pivotable relative to the cross bar 66 in a front-rear direction of the lawn mower 10, and the left and right lock portions 63 are engageable with the connection frame member 45 engaged in the left and right support recesses 61a.

The grass clippings receptacle 24 is attached to the rear end portion of the chute 25 in the following manner. First, the opposite end portions of the connection frame member 45 of the grass clippings receptacle 24 are engaged in the left and right support recesses 61a. Then, the locking pivot arm 62 is pivoted upward so that the left and right lock portions 63 are brought into engagement with connection frame member 45. As a consequence, the connection frame member 45 is supported and locked by the support section 27 of the chute 25. After that, the lid 28 is put on the grass clippings receptacle 24 to close the top side of the grass clippings receptacle 24. In this manner, the operation for attaching the grass clippings receptacle 24 to the chute 25 is completed.

The grass clippings receptacle 24 is detached from the rear end portion of the chute 25 in the following manner. First, the lid 28 is detached from the connection frame member 45. Then, the left and right lock portions 63 are disengaged from the connection frame 45. Finally, the connection frame member 45 is disengaged from the left and right support recesses 61a. In this manner, the operation for detaching the grass clippings receptacle 24 from the chute 25 is completed.

Each of the left and right receptacle supporting portions 61 disposed within the grass clippings receptacle 24 has a placing portion 67. Namely, with the grass clippings receptacle 24 supported by the support section 27, at least parts of the support section 27, e.g. the left and right receptacle supporting portions 61 having the respective placing portions 67 are located within the grass clippings receptacle 24.

More specifically, the left and right receptacle supporting portions 61, each having a substantially L shape as viewed in side elevation, have the placing portions 67 on their respective intermediate corner regions. The placing portions 67 of the left and right receptacle supporting portions 61 (i.e., left and right placing portions 67) are provided for placing thereon the bottom plate 50 folded in the collapsed position, and each of the placing portions 67 may be, for example, in the form of a vertical plate. For that purpose, the placing portions 67 each have a receiving recess 67a that opens forwardly and upwardly for receiving one end portion of the collapsed bottom plate 50.

Figure 6:
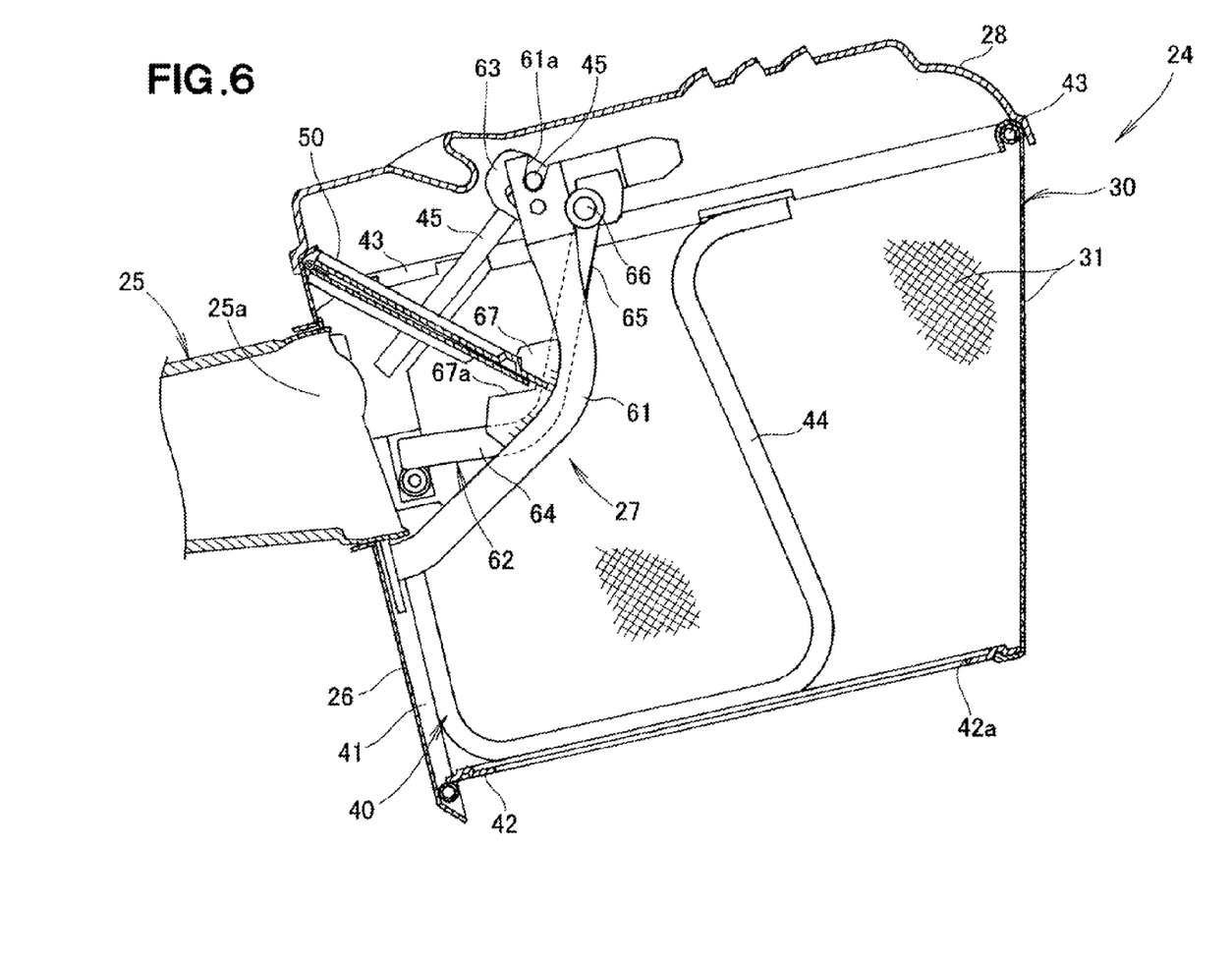
FIG. 6 is a sectional view showing the collapsed bottom plate snugly accommodated within the grass clippings receptacle.
Figure 7:
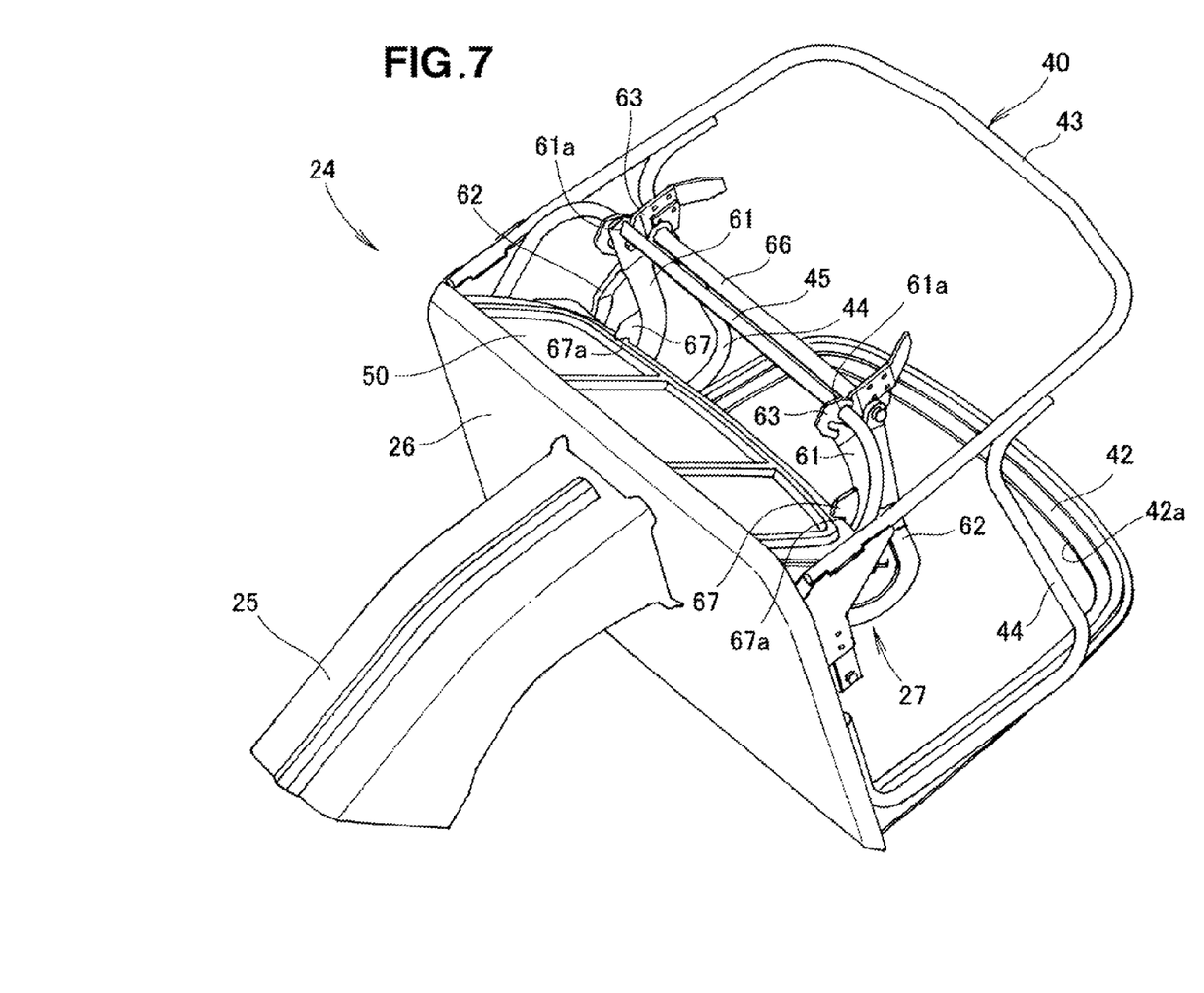
FIG. 7 is a perspective view of the retaining frame, the support section and the bottom plate placed on the support section.

As shown in FIGS. 6 and 7, the collapsed bottom plate 50 is placed on the left and right placing portions 67 with the lower end thereof engaged in the receiving recesses 67a of the placing portions 67 and with the upper end thereof propped against the rear surface of the back plate 26. Thus, the bottom plate 50 detached from the bottom frame member 42 can be snuggly accommodated within the grass clippings receptacle 24. Namely, the bottom plate 50 detached from the bottom frame member 42 can be collapsed into a smaller size, and the thus-collapsed bottom plate 50 can be readily snuggly accommodated within the grass clippings receptacle 24 by being merely placed on the left and right placing portions 67.

A placed-on position of the bottom plate 50, where the bottom plate 50 is placed on the placing portions 67 as above, is a position where the bottom plate 50 faces the exit 25a of the chute 25 in such a manner that grass clippings (cut grass) and grass clippings delivering air Wt, having entered the grass bag 30 through the exit 25a, can be directed downward by the bottom plate 50. Thus, the grass clippings having entered the grass bag 30 can be discharged directly downward though the opening 42a of the grass clippings receptacle 24.

Figure 8:
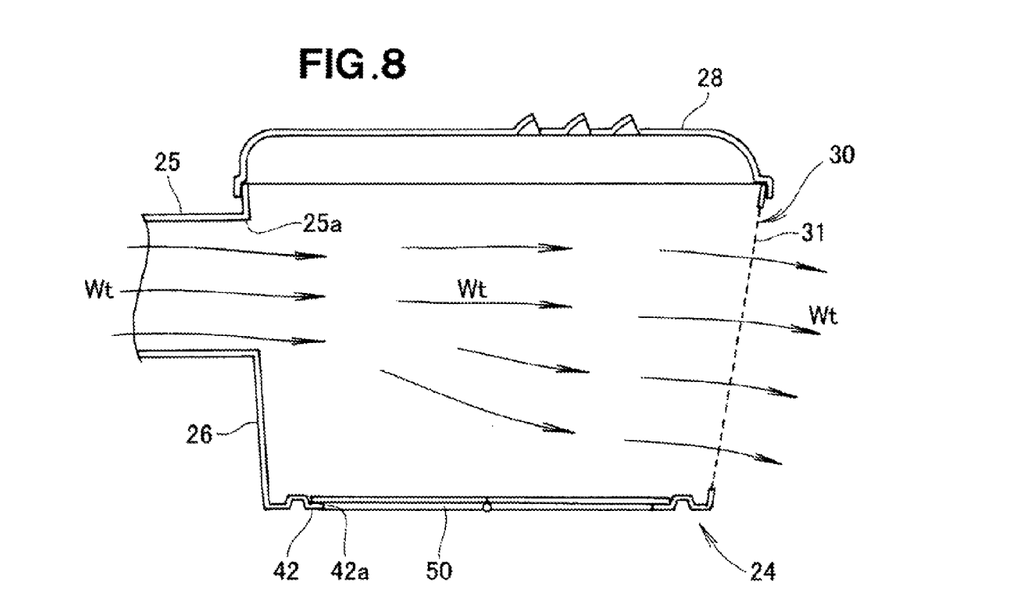
FIG. 8 is a view explanatory of behavior of the grass clippings receptacle when the lawn mower is in a bagging mode as shown in FIG. 2.

The following describe behavior of the instant embodiment of the lawn mower 10 constructed in the above-described manner. In the bagging mode, the bottom plate 50 is mounted on, or attached to, a lower portion of the grass clippings receptacle 24 as shown in FIG. 8. Namely, the bottom plate 50 is placed on the bottom frame member 42 to close the opening 42a. Thus, the grass clippings are delivered by the grass clippings delivering air Wt from the chute 25 into the grass clippings receptacle 24. The grass clippings delivering air Wt having delivered the grass clippings into the grass clippings receptacle 24 is discharged through the side surfaces 31 of the grass bag 30, while the grass clippings are collected in the grass clippings receptacle 24.

Figure 9:
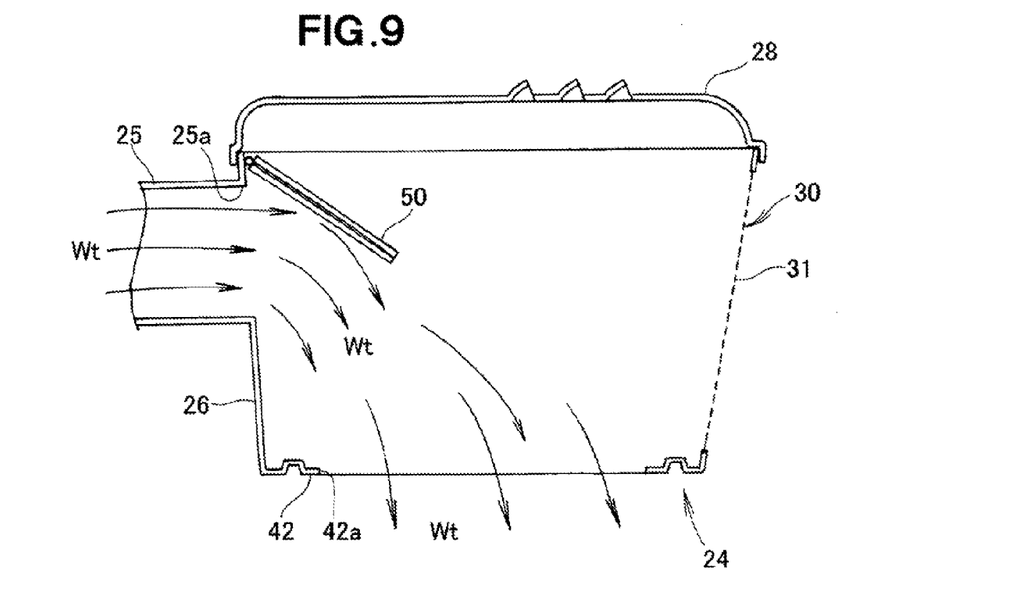
FIG. 9 is a view explanatory of behavior of the grass clippings receptacle when the lawn mower is in a rear discharge mode as shown in FIG. 6.

In the rear discharge mode, on the other hand, the bottom plate 50 is detached from the lower portion of the grass clippings receptacle 24 and folded into the collapsed position as shown in FIG. 9, and the thus-collapsed bottom plate 50 is engaged by the placing portions 67 (see FIG. 6) located within the grass clippings receptacle 24. Thus, the opening 42a of the bottom frame member 42 is opened. The bottom plate 50 engaged by the placing portions 67 faces the exit 25a of the chute 25, slanting rearwardly and downwardly relative to the exit 25a. Grass clippings are delivered by the grass clippings delivering air Wt from the chute 25 into the grass bag 30 and directed downward by the bottom plate 50. The grass clippings and the grass clippings delivering air Wt are discharged directly downward through the opening 42a.

The forgoing description can be summarized as follows. The detachably attachable bottom plate 50 of the grass clippings receptacle 24 is attached to the lower portion of the grass clippings receptacle 24 in the bagging mode and detached from the lower portion of the grass clippings receptacle 24 in the rear discharge mode. Thus, the instant embodiment can simplify the mode switching operation and the lawn mower cleaning operation as well. Further, because the bottom plate 50 detached from the lower portion of the grass clippings receptacle 24 can be snugly accommodated within the grass clippings receptacle 24, it is not necessary for the human operator to carry the detached bottom plate 50 by hand or the like, nor is it necessary for the human operator to secure a separate storage location for the detached bottom plate 50.

It should be appreciated that the lawn mower 10 of the present invention is not limited to a riding lawn mower and may be a walk-behind type lawn mower.

The basic principles of the present invention are well suited particularly for application to riding lawn mowers and walk-behind type lawn mowers.

Obviously, various minor changes and modifications of the present invention are possible in light of the above teaching. It is therefore to be understood that within the scope of the appended claims the invention may be practiced otherwise than as specifically described.

What is claimed is:

1. A lawn mower comprising:
   a cutting blade provided in a housing;
   a cut grass receptacle disposed rearward of the housing; and
   a chute connecting between the housing and the cut grass receptacle, grass cut by the cutting blade being delivered, by cut grass delivering air, to the cut grass receptacle via the chute,
   wherein the cut grass receptacle has a bottom plate detachably attachable thereto, the bottom plate being a collapsible member,
   wherein the cut grass receptacle is constructed to allow the bottom plate to be accommodated within the receptacle when detached from the cut grass receptacle, and
   wherein a placing portion for placing the bottom plate thereon, while folded in a collapsed position, is located within the cut grass receptacle.

2. The lawn mower according to claim 1,
   wherein the chute includes a support section provided on an end portion thereof for supporting the cut grass receptacle, and
   wherein, with the cut grass receptacle supported by the support section, at least a part of the support section is located within the cut grass receptacle, and
   wherein the part of the support section includes the placing portion.

3. The lawn mower according to claim 2, wherein, in a placed-on position of the bottom plate where the bottom plate is placed on the placing portion of the support section in the collapsed position, the bottom plate faces an exit of the chute in such a manner that the cut grass and cut grass delivering air, having entered the cut grass receptacle through the exit, are directed downward by the bottom plate.

* * * * *